(12) United States Patent  
Baraldi et al.

(10) Patent No.: US 8,910,145 B2  
(45) Date of Patent: Dec. 9, 2014

(54) METHOD AND DEVICE FOR INSTALLING/UNINSTALLING SOFTWARE MODULES, WITH CENTRALIZED RESOLUTION OF CONSTRAINTS, IN AIRCRAFT EQUIPMENT ITEMS

(75) Inventors: Thierry Baraldi, Plaisance du Touch (FR); William Barsse, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 212 days.

(21) Appl. No.: 13/417,799

(22) Filed: Mar. 12, 2012

(65) Prior Publication Data

US 2012/0240108 A1 Sep. 20, 2012

(30) Foreign Application Priority Data

Mar. 18, 2011 (FR) ...................................... 11 52266

(51) Int. Cl.
*G06F 9/445* (2006.01)

(52) U.S. Cl.
CPC ... *G06F 8/62* (2013.01); *G06F 8/61* (2013.01)
USPC ........... 717/174; 717/155; 717/156; 717/175; 717/178

(58) Field of Classification Search
CPC ................ G06F 8/61; G06F 8/62; G06F 8/65
See application file for complete search history.

(56) References Cited

U.S. PATENT DOCUMENTS

| | | | |
|---|---|---|---|
| 5,355,474 A * | 10/1994 | Thuraisngham et al. ..... | 707/759 |
| 5,721,824 A | 2/1998 | Taylor | |
| 6,086,617 A * | 7/2000 | Waldon et al. .................... | 703/2 |
| 6,128,730 A * | 10/2000 | Levine .............................. | 713/1 |
| 6,300,948 B1 * | 10/2001 | Geller et al. ................... | 715/866 |
| 7,155,713 B1 | 12/2006 | Burkhardt et al. | |
| 2002/0129177 A1* | 9/2002 | McGuire et al. .............. | 709/315 |
| 2004/0034850 A1 | 2/2004 | Burkhardt et al. | |
| 2005/0132350 A1 | 6/2005 | Markley et al. | |
| 2005/0198621 A1* | 9/2005 | Tillmann et al. .............. | 717/128 |
| 2007/0234361 A1* | 10/2007 | Iannucci et al. .............. | 718/100 |
| 2007/0277130 A1* | 11/2007 | Lavelle ............................ | 716/4 |
| 2008/0127041 A1* | 5/2008 | Gura ............................. | 717/101 |
| 2008/0189696 A1* | 8/2008 | De Sutter et al. ............. | 717/168 |

(Continued)

FOREIGN PATENT DOCUMENTS

EP 0 802 480 A1 10/1997
EP 1 548 586 A2 6/2005

OTHER PUBLICATIONS

French Preliminary Search Report issued Sep. 9, 2011, in French 1152266, filed Mar. 18, 2011 (with English Translation of Categories of Cited Documents).

*Primary Examiner* — Chameli Das
(74) *Attorney, Agent, or Firm* — Oblon, Spivak, McClelland, Maier & Neustadt, L.L.P.

(57) ABSTRACT

A system, method and device for installation and/or deinstallation of at least one software module, with centralized resolution of constraints, in aircraft equipment items. After having received a list of software module references, the list comprising at least one reference to the at least one software module, and at least one command, linked to the at least one reference, for installation of deinstallation of the at least one software module, the constraints are accessed. This access is independent of the access to the at least one software module. A sequence of basic operations resolving the constraints then is evaluated for applying the at least one command to the at least one reference.

12 Claims, 4 Drawing Sheets

(56) References Cited

U.S. PATENT DOCUMENTS

| | | | |
|---|---|---|---|
| 2009/0037889 A1* | 2/2009 | Li et al. | 717/140 |
| 2009/0138385 A1* | 5/2009 | Harnish et al. | 705/28 |
| 2009/0138871 A1* | 5/2009 | Kimberly et al. | 717/173 |
| 2009/0138872 A1* | 5/2009 | Fuchs et al. | 717/173 |
| 2009/0138873 A1* | 5/2009 | Beck et al. | 717/173 |
| 2009/0187976 A1* | 7/2009 | Perroud et al. | 726/4 |
| 2010/0199257 A1* | 8/2010 | Biggerstaff | 717/104 |
| 2010/0281456 A1* | 11/2010 | Eizenman et al. | 717/104 |
| 2010/0293127 A1* | 11/2010 | Hamadi et al. | 706/47 |
| 2010/0333109 A1* | 12/2010 | Milnor | 718/106 |
| 2011/0126197 A1* | 5/2011 | Larsen et al. | 718/1 |
| 2012/0017200 A1* | 1/2012 | Ghosh et al. | 717/126 |
| 2012/0096433 A1* | 4/2012 | Reinhold et al. | 717/120 |

* cited by examiner

METHOD AND DEVICE FOR INSTALLING/UNINSTALLING SOFTWARE MODULES, WITH CENTRALIZED RESOLUTION OF CONSTRAINTS, IN AIRCRAFT EQUIPMENT ITEMS

This invention relates to the configuration of computer equipment items in aircraft and more particularly to a method and a device for installation/deinstallation of software modules, with centralized resolution of constraints, in aircraft equipment items.

BACKGROUND OF THE INVENTION

Modern aircraft comprise more and more electronic and computer systems to improve their performances and to assist the pilot as well as the crew members during their missions. Thus, for example, the fly-by-wire controls make it possible to reduce the mechanical complexity of transmission of controls to the actuators and therefore the weight associated with these controls. Likewise, the presentation of pertinent information items enables the pilot to optimize the flight paths and to respond rapidly to any detected incident. Such information items are, in particular, speed, position, heading, meteorological and navigational data. These electronic and computer systems as a whole generally are called the avionics.

For reasons of reliability, the avionics often was shared functionally by specific modules, also called LRU (abbreviation for Line Replaceable Unit in English terminology). According to this architecture, a point-to-point transmission mode is used between each module. Thus, for example, the flight controls are handled in a special device while the electrical supply is handled in another one. In this way, a specific function is associated with each module.

Furthermore, each module supporting a critical function preferably is redundant so that the failure of one module does not bring about the loss of the associated function. The use of an aircraft utilizing a redundant module when the main module is faulty may necessitate a maintenance operation.

In order to improve the functionalities of the aircraft, to reduce the weight of the electronic equipment items by virtue of a greater integration, to reduce the costs by virtue of the use of generic modules, and to facilitate maintenance operations, the avionics now is more and more integrated according to an architecture called IMA (abbreviation for Integrated Modular Avionics in English terminology). According to this architecture, the functionalities of the avionic systems use as much as possible the generic computation and input/output resources in which they are implemented. These resources are distributed in the equipment items which each comprise numerous software modules. A system of segregation or partitioning makes it possible to isolate each of the functionalities so that the failure of one function does not affect another one.

By way of illustration, patent application FR 2 903 511 describes such an architecture.

Within each equipment item of the aircraft, software modules are loaded and updated by an operator who is on board the aircraft to perform these operations. The role of the operator is in particular to start the loading of these modules or these updates and to verify that the selected configuration has been properly loaded into the equipment item.

These operations typically are performed by using a centralized loading system that makes it possible to address all of the downloadable equipment items.

Figure 1:
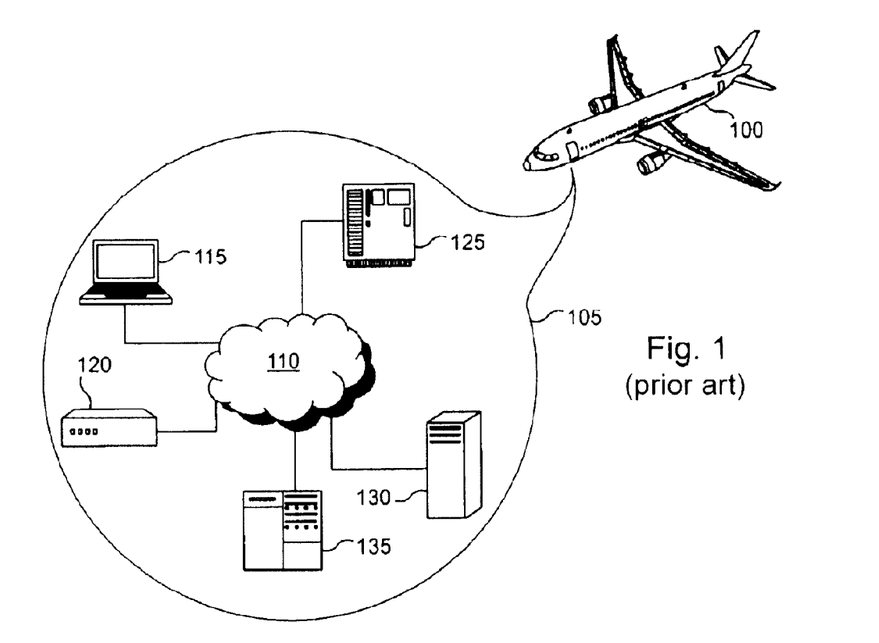
FIG. 1 illustrates an exemplary aircraft comprising a standard on-board data processing system.

FIG. 1 illustrates an exemplary aircraft 100 comprising an on-board data processing system 105. System 105 itself comprises a communication network 110, for example a communication network in accordance with the AFDX (abbreviation for Avionic Full DupleX in English terminology) standard, to which equipment items here referenced 115 to 135 are connected. Some of these equipment items may have a specific role in the context of loading and updating software modules in the equipment items. Thus, for example, equipment item 115 may comprise a software module providing a centralized loading system function making it possible to address all of the downloadable equipment items, itself among others. Still by way of illustration, equipment item 120 may be used as storage location, also called repository in English terminology, for storing software modules to be installed on equipment items. Equipment 120 then typically comprises a reading device, for example a memory card reader or a DVD reader, making it possible to transfer software modules coming from the components manufacturers into the storage location.

The software modules generally are supplied by components manufacturers in the form of loads, that is to say assemblies comprising software applications or functions as well as elements that cannot be falsified making it possible to authenticate these software applications or functions, that is to say to demonstrate the integrity and origin thereof.

The operations to be carried out by an operator for loading equipment items may be different from one equipment item to another, in particular according to constraints peculiar to certain equipment items. Such constraints may be multiple. They may relate, for example, to orders of installation or erasures. They are linked to the complexity of the software modules and their interactions.

In order to take these constraints into consideration, the designers of on-board data processing systems generally write up procedures that are to be followed by the operators during operations of loading and updating software modules. Nevertheless, such procedures complicate the operators' operations, are time-consuming for them and constitute a potential source of problems linked to errors in handling.

In order to limit these problems, the implementation of constraints may be performed with the aid of functions for processing by lots, called batch functions. A batch function here is a function making it possible to implement the installation of software modules automatically in a given order. Nevertheless, this function does not cover all the types of constraints. Moreover, batch functions may be regarded as a translation of procedures. Consequently, the use of batch functions instead of procedures only shifts a part of the complexity linked to the operators' procedures to the programming of batch functions. Finally, the number of batch functions to be implemented is linked directly to the number of possible cases of loadings of software modules, which is prohibitive for a standard solution.

A need therefore exists, in on-board systems, in particular aircraft on-board systems, to manage constraints during installation or updating of software modules, making it possible to define uniform procedures for the operators responsible for these operations. The management of constraints preferably should not require modification of the loads generated by components manufacturers so that it is not necessary to modify the existing loads (so that the existing loads are usable without modification).

BRIEF SUMMARY OF THE INVENTION

The invention makes it possible to resolve at least one of the problems set forth above.

The invention thus has as an object a computer method for the installation or deinstallation of at least one software module in at least one equipment item of an on-board system, according to at least one dependency constraint applying to the said at least one software module, this method comprising the following steps, reception of a list of software module references, the said list comprising at least one reference to the said at least one software module;

reception of at least one command, linked to the said at least one reference, for installation or deinstallation of the said at least one software module;

access to the said at least one constraint, access to the said at least one constraint being independent of access to the said at least one module; and evaluation of a sequence of basic operations resolving the said at least one constraint for applying the said at least one command to the said at least one reference.

The method according to the invention thus makes it possible to process a command for installation and/or deinstallation of software modules according to constraints managed automatically, independently of the software modules. It thus is not necessary to modify these software modules for them to be processed according to constraints determined independently of their development.

According to a specific embodiment, the method further comprises, following execution of the said step of evaluating the said list of basic operations, a step of obtaining the said at least one software module thus making it possible to install it.

The method advantageously further comprises a step of authentication of the said at least one software module, the said at least one software module being coded in a structure enabling its authentication. In this way the method according to the invention makes it possible to check the integrity of the module before installation thereof in order to check the security of the equipment item of the on-board system.

The method preferably further comprises a step of authentication of the said at least one constraint, the said at least one constraint being coded in a structure enabling its authentication, the said coding structures of the said at least one software module and the said at least one constraint being separate and independent. In this way the method according to the invention makes it possible to check the integrity of constraints before installation and/or deinstallation of software modules in order to check the security of the equipment item of the on-board system.

The invention also has as an object a computer program comprising instructions adapted for the implementation of each of the steps of the method described above when the said program is run on a computer. The advantages obtained by this computer program are similar to those cited above.

The invention also has as an object a device for installation or deinstallation of at least one software module in at least one equipment item of an on-board system, according to at least one dependency constraint applying to the said at least one software module, this device comprising the following means, means for reception of a list of software module references, the said list comprising at least one reference to the said at least one software module, and at least one command, linked to the said at least one reference, for installation or deinstallation of the said at least one software module;

means for access to the said at least one constraint; and means for evaluation of a list of basic operations resolving the said at least one constraint for applying the said at least one command to the said at least one reference.

In this way the device according to the invention makes it possible to process a command for installation and/or deinstallation of software modules according to constraints managed automatically, independently of the software modules. Thus it is not necessary to modify these software modules for them to be processed according to constraints determined independently of their development.

The device preferably further comprises means for obtaining the said at least one software module and transmitting the said at least one software module to the said at least one equipment item, enabling installation thereof.

The invention also has as an object an on-board system comprising the device described above, the said on-board system comprising at least two equipment items connected to one another via a communication network, the said device belonging to one of the said at least two equipment items in order to enable installation or deinstallation of the said at least one software module in the other of the said at least two equipment items.

The invention likewise has as an object an on-board system comprising the device described above, the said on-board system comprising at least two equipment items connected to one another via a communication network, the said reception means belonging to one of the said at least two equipment items and the said access and evaluation means belonging to the other of the said at least two equipment items in order to enable installation or deinstallation of the said at least one software module in the said other of the said at least two equipment items.

The invention likewise has as an object an aircraft comprising the on-board system described above.

The advantages provided by these on-board systems and this aircraft are similar to those described above.

BRIEF DESCRIPTION OF THE DRAWINGS

Other advantages, purposes and characteristics of this invention become apparent from the detailed description that follows, presented by way of non-limitative example, with reference to the attached drawings in which:

FIG. 2, comprising

FIG. 3, comprising

DETAILED DESCRIPTION OF THE INVENTION

In general, the invention makes it possible to resolve dependency constraints for loading/dumping software modules, in equipment items of an on-board data processing system, through a centralized loading system using an external declaration of constraints.

All of these constraints preferably are expressed in external structures, for example third-party files, comprising the constraints themselves and information items making it possible to authenticate these constraints, that is to say in a third-party load. Such a third-party load is independent of the loads from the components manufacturers having supplied the equipment items concerned. The third-party load in particular may be created by the designer of the on-board system comprising the equipment items. The constraints are, for example, supplied by the components manufacturers in a formal document.

According to a specific embodiment, an equipment item of the on-board system comprises at least one part of a centralized loading application providing a user interface. This interface makes it possible in particular for an operator to select one or more specific equipment items and, for each of these equipment items, a list of software modules or loads to be loaded, dumped or updated. He then may start the loading, dumping and/or updating operations. The interactions asked of the operator with regard to the loading application here are similar irrespective of the equipment item and the list of software modules to be loaded, dumped and/or updated.

The centralized loading system then uses the list of software modules to be loaded, dumped and/or updated as well as the content of the third-party load comprising constraints for determining a sequence of basic loading, dumping and/or updating operations to be performed and making it possible to verify all of the constraints. The centralized loading system then carries out these basic operations on the equipment items concerned.

The operations that may be requested by an operator typically are operations for installation of software modules on one or more equipment items and operations for deinstallation of software modules on one or more equipment items. Advantageously, an installation has two variations, one intended for the installation of a software module on an equipment item and the other intended for the updating of this software module in this equipment item. The basic operations thus are operations for installation and deinstallation of loads. In this way, it is not necessary to use an updating function, as such, for software modules.

By way of illustration, the constraints contemplated here are dependency constraints, in particular dependency constraints for installation, deinstallation and updating. Thus, considering two software modules (or loads) A and B, a rule for application of an installation dependency constraint between these modules may be expressed in the following way: if module B is dependent on module A, then module B can be correctly installed only if module A already has been installed in the equipment item.

Likewise, a rule for application of a dependency constraint for deinstallation between these modules may be expressed in the following way: if module A is dependent on module B, then module A can be correctly deinstalled only if module B already has been deinstalled in the equipment item.

Similarly, a rule for application of a constraint for capacity of a software module to manage an updating may be expressed in the following way: if module A is not capable of managing the updatings, then, in order to install a version n+1 of module A, it first is necessary to deinstall a prior installed version of module A; otherwise, version n+1 may be installed directly.

Even if, for the sake of clarity, the rules set forth above by way of example apply to only two software modules, they may apply to more than two modules. Thus, if a software module A is dependent on two software modules B and C, the installation of module A requires the prior installation of modules B and C.

Moreover, even if a constraint and a rule for application of this constraint may be expressed separately, in the form of a specific constraint (for example "the installation of A is dependent on B") and a generic rule (for example "if the installation of y is dependent on x, then y can be installed only if x is installed"), they also may be expressed in common, for example in the form of an instantiated rule (for example "if the installation of B is dependent on A, then B can be installed only if A is installed"), that is to say a rule applying to specific software modules.

As indicated above, the dependency constraints associated with all the software modules able to be installed in the equipment items of an on-board system are described in a third-party load. These constraints advantageously are expressed by type. Thus the third-party load may comprise three parts, a first part linked to the dependency constraints for installation, a second part linked to the dependency constraints for deinstallation and a third part linked to the capacity of a load to manage an updating. These three parts may be generic, that is to say common to all equipment items (with the exception of the equipment items covered by specific constraints) or constraints specific to certain equipment items.

By way of illustration, the lines of pseudo-code presented in Annex A1 show an exemplary excerpt from the content of a third-party load comprising generic constraints and constraints specific to an equipment item EQUIP_AA. In this example, the symbols following the characters "//" are considered as representing comments and are not processed. Furthermore, the notation "i: expression" means that the expression following the identifier i applies only to the equipment item referenced "i," the absence of reference for an equipment item meaning that the expression applies generically, that is to say to all the equipment items (with the exception of those covered by specific constraints). The characters "→" create an installation dependency link between the referenced software modules on each side of these characters. Likewise, the characters "←" create a deinstallation dependency link between the referenced software modules on each side of these characters and the character "=" expresses an updating constraint on the referenced software modules to the left of this character. Of course, other conventions may be used.

Thus, the expression "A→B, C" means that, in general, the installation of software module A is dependent on the installation of software modules B and C. Likewise, the expression "EQUIP_AA: A→B" means that, for referenced equipment item EQUIP_AA, the installation of software module A is dependent on the installation of software module B. Similarly, the expression "B←A" means that, in general, the deinstallation of software module B is dependent on the deinstallation of software module A and the expression "B=" means that, in general, software module B does not support any updating (that is to say it requires its deinstallation before installation of a different version).

It is seen here that only definite constraints may be mentioned in the third-party load. Thus, for example, the constraint "C→" is not obligatory to the extent that it does not actually involve a constraint but merely an information item intended to make it clear that software module C does not have any installation dependency.

In this way, from a list of software modules or loads to be installed or deinstalled, it is possible, by using constraints of a third-party load and rules for application of constraints, to deduce therefrom a sequence of basic operations.

Of course, the dependency constraints must be accessible before any installation and/or deinstallation operation, these constraints being necessary for generating a sequence of basic installation/deinstallation operations. Furthermore, it is seen that the dependency constraints are not suited for evolving continuously. In fact, the main reasons leading to a change of dependency constraints are the appearance of new software modules to be installed and the modification of existing software modules.

Thus, by way of illustration, going back to the rules for application of constraints described above and the constraints presented in Annex A1, if an operator requests the installation of software modules A, B, C, D and E in an equipment item not comprising any software module, the central loading system deduces therefrom the following installation sequence: C, B, A, E, D which verifies the constraints imposed by the equipment item.

Similarly, if an equipment item comprises software modules A, B, C, D and E and if an operator requests deinstallation of software modules B and E, the central loading system, still on the basis of the rules for application of constraints described above and the constraints presented in Annex A1, determines the following deinstallation sequence: A, B, D and E which verifies the constraints imposed by the equipment item.

Likewise, if an equipment item comprises software modules A, B, C, D and E, these software modules being in a version n, and if an operator requests the updating of software modules A, B and C with a version n+1, the central loading system, still on the basis of the rules for application of constraints described above and the constraints presented in Annex A1, determines the following sequence: installation of software module C, deinstallation of software module A then of software module B then installation of software module B then of software module A, which verifies the constraints imposed by the equipment item.

It is seen here that if an operator can, according to a specific embodiment, supply the list of all the software modules to be installed and/or deinstalled and meeting all the dependency restraints, the central loading system signaling an error if modules are missing, it also is possible for an operator, according to another embodiment, to supply only the list of software modules to be installed and/or deinstalled, without taking dependency constraints into consideration. In this case, the list of software modules to be installed and/or deinstalled is completed by the central loading system according to the constraints expressed in the third-party load and the predefined rules for application of constraints.

Figure 2A:
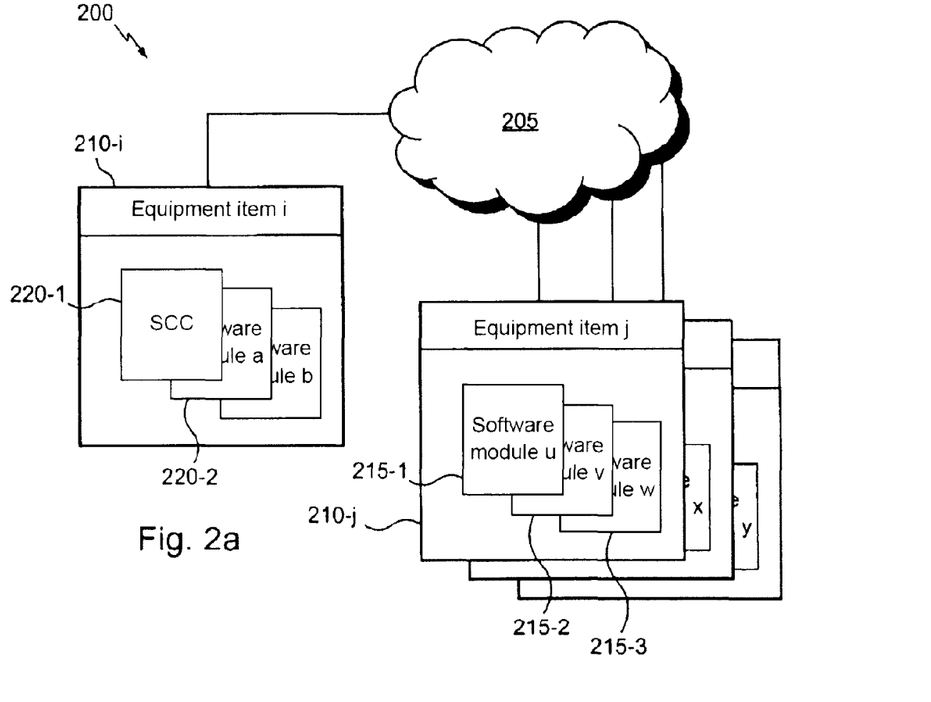
FIGS. 2a and 2b, illustrates a first exemplary implementation of the invention.
Figure 2B:
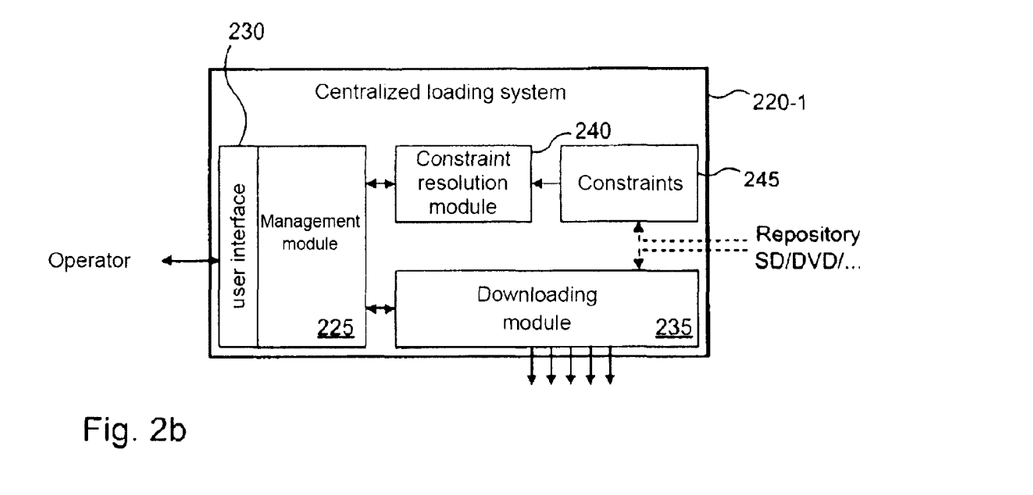

FIG. 2, comprising FIGS. 2a and 2b illustrates a first exemplary embodiment of the invention.

FIG. 2a schematically illustrates the architecture of an on-board data processing system 200 implementing the invention, according to a first embodiment. As shown, this system comprises a communication network 205, for example an AFDX network, to which equipment items are connected, in particular equipment items 210-i and 210-j. Each equipment item comprises, or may comprise, software modules. Thus, for example, equipment item 210-j comprises software modules u, v and w, referenced 215-1, 215-2, 215-3, respectively. Equipment 210-i here comprise a specific module, referenced 220-1, corresponding to the centralized loading system (marked SCC). This module itself comprises several elements, for example several software modules.

As indicated above, the centralized loading system makes it possible to address all of the downloadable equipment items, in particular the equipment item implementing the centralized loading system itself, in order to install or deinstall software modules. Thus, for example, software module 220-1 enables an operator to install software module 220-2. The software module corresponding to the centralized loading system preferably is preinstalled in a specific equipment item, for example in a non-volatile memory of this equipment item (alternatively, it may, for example, comprise means for installing this software module).

Equipment item 210-i comprising the centralized loading system is, for example, an ANSU (abbreviation for Aircraft Network Server Unit in English terminology) server.

FIG. 2b illustrates an exemplary logic architecture of the software module corresponding to the centralized loading system 220-1 illustrated on FIG. 2a. Centralized loading system 220-1 here comprises a management software module referenced 225, used to manage the software modules in the equipment items of the on-board system. This module comprises a user interface 230, preferably a graphical interface, in particular enabling an operator to select equipment items and software modules as well as to activate installation and/or deinstallation operations.

Centralized loading system 220-1 further comprises a downloading module 235 making it possible to remotely control the loading of software modules into equipment items as well as the deinstallation of software modules in these equipment items.

Centralized loading system 220-1 here also comprises a software module 240 for resolution of constraints able to access constraints 245 for establishing, according to a list of software modules to be installed and/or deinstalled, a sequence of basic operations.

Constraints 245, preferably expressed in a third-party load, and/or the software modules to be installed may originate from a removable storage medium, for example a memory card of SD (abbreviation for Secure Digital in English terminology) type or a DVD, which the central loading system may access or a specific storage location (repository).

An operator may interact with management module 225 of the equipment items via user interface 230, to enable selection of equipment items and software modules and to activate installation or deinstallation thereof.

An operator's selections are transmitted by management module 225 which transmits them to constraint resolution module 240 so as to obtain a sequence of basic operations for installation and/or deinstallation of software modules. After having been evaluated, the defined sequence is transmitted to management module 225 which controls the basic operations accordingly performed by downloading module 235.

If the constraint resolution module cannot evaluate a sequence of basic instructions satisfying an operator's request and the dependency constraints, an error message preferably is addressed to the operator, via interface 230. If need be, the error message advantageously comprises a list of missing software modules that would make it possible to resolve the constraints. In this way the operator may select the missing software modules or validate a proposed choice and make an installation request again.

In this way, according to the example illustrated on FIG. 2, the centralized loading system is implemented in a specific equipment item from which an operator can control the operations of installation and deinstallation of software modules in other equipment items or in the specific equipment item itself.

According to another exemplary implementation of the invention, illustrated on FIG. 3, a part of the centralized loading system is implemented in a specific equipment item from which an operator may control the operations of installation and deinstallation of software modules in other equipment items or in the specific equipment item itself, while another part of the centralized loading system is implemented in the equipment item in which one or more software modules are installed and/or deinstalled.

Figure 3A:
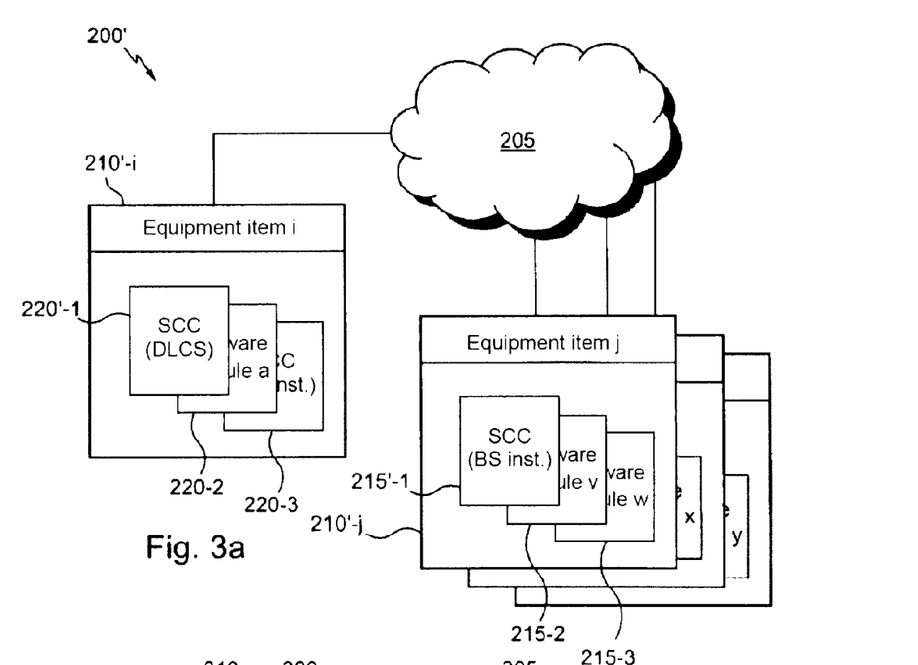
FIGS. 3a and 3b, illustrates a second exemplary implementation of the invention.

FIG. 3a schematically illustrates the architecture of an on-board data processing system 200' implementing the invention, according to a second embodiment. Like system 200 described with reference to FIG. 2a, this system comprises a communication network 205 such as an AFDX network to which equipment items, in particular equipment items 210'-i and 210-j, are connected. Again, each equipment item comprises, or may comprise, software modules. Equipment item 210'-j here comprises a specific module, referenced 215'-1, corresponding to a part of the centralized loading system (marked SCC) as well as software modules v and w, referenced 215-2, 215-3, respectively. Likewise, equipment item 210'-i comprises a specific module, referenced 220'-1, corresponding to a part of the centralized loading system as well as other software modules, for example the software module referenced 220-2.

It is seen here that among these other software modules there may be a software module 220-3 corresponding to a part of the centralized loading system and similar to software module 215'-1. This software module makes it possible, together with module 220'-1, to install or deinstall software modules in equipment item i (210'-i).

Again, the centralized loading system makes it possible to address all of the downloadable equipment items in order to install or deinstall software modules. In this way, for example, software module 220'-1, combined with software module 215'-1, enables an operator to install software module 215-3.

Equipment items 210'-i and 210'-j are, for example, ANSU servers.

Figure 3B:
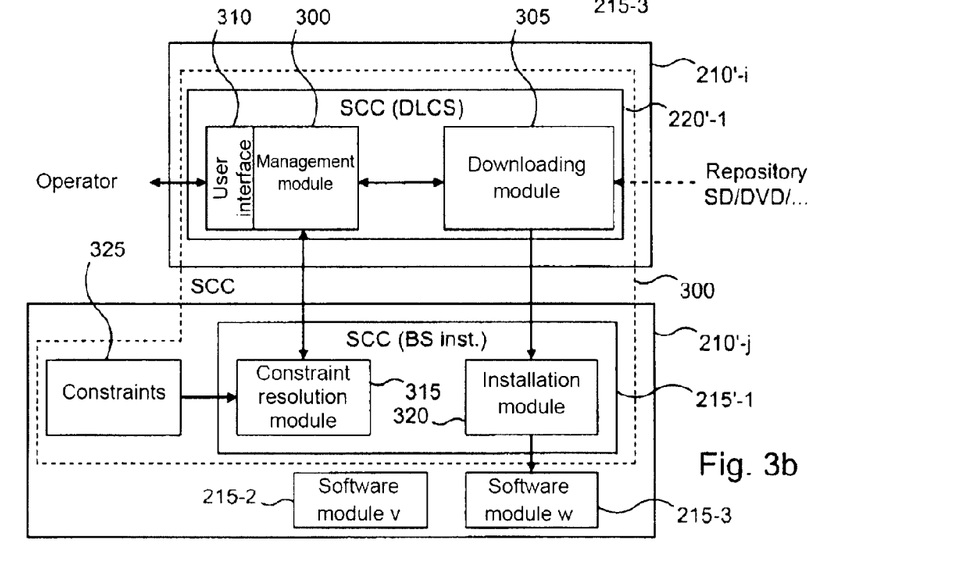

FIG. 3b illustrates an exemplary logic architecture of the centralized loading system distributed between software modules 220'-1 and 215'-1, and therefore between equipment items 210'-i and 210'-j, illustrated in FIG. 3a.

The part of the centralized loading system implemented in module 220'-1 of equipment item 210'-i corresponds essentially to a software module known under the name of DLCS (abbreviation for data loading and configuration system in English terminology), itself comprising a management software module referenced 300, used for managing software modules in equipment items, and a downloading model referenced 305 making it possible to control the loading of software modules into equipment items. Management module 300 here comprises a user interface 310, preferably a graphical interface, in particular enabling an operator to select equipment items and software modules as well as to activate installation and/or deinstallation operations.

The downloading module can access a removable storage medium, for example an SD-type memory card or a DVD, or a specific storage location (repository) in order to obtain a third-party load or software modules to be installed.

The part of the centralized loading system implemented in module 215'-1 of an equipment item 210'-j in which software modules are to be installed and/or deinstalled may be regarded as a basic installation service (BS inst.). This service here comprises a constraint resolution software module 315 and an installation software module 320 enabling installation of software modules transmitted by downloading module 305.

As described above, the dependency constraints preferably are expressed in third-party loads. These constraints, here referenced 325, are to be transferred to equipment item 210'-j in which software modules are to be installed or deinstalled before basic installation or deinstallation operations are addressed thereto. The third-party load advantageously comes from equipment item 210'-i implementing the other part of the centralized loading system.

An operator can interact with management module 300 for the equipment items, via user interface 310, in order to enable selection of equipment items and software modules and to activate installation or deinstallation thereof.

As in the first embodiment described above, an operator's selections are transmitted by management module 300 to constraint resolution module 315 so as to obtain a sequence of basic operations for installation and/or deinstallation of software modules. After having been determined, the defined sequence is transmitted to management module 300 that controls the basic operations performed accordingly by downloading module 305 and installation module 320.

As described above, if the constraint resolution module cannot find a sequence of basic instructions satisfying an operator's request and the dependency constraints, an error message preferably is addressed to the operator, via interface 310. If need be, the error message advantageously comprises a list of missing software modules that would make it possible to resolve the constraints. In this way the operator may select the missing software modules or validate a proposed choice and make an installation request again.

The downloading module then transmits basic instructions to installation module 320 responsible for installing or deinstalling software modules in equipment item 210'-j. When a basic instruction for installation of a software module is transmitted to installation module 320, this instruction preferably is accompanied by the software module to be installed or by a reference thereto enabling installation module 320 to access it. In this way, the latter can, for example, install software module 215-3 in equipment item 210'-j. As described above, the software modules to be installed may come from a removable storage medium, for example an SD-type memory card or a DVD, or a specific storage location (repository).

Module 320 advantageously calls on module 315 to undertake a verification of dependencies before undertaking an installation or deinstallation. This dual verification makes it possible to prevent an error or a problem in module 210'-j.

Constraint resolution modules 240 and 315 advantageously use a topological sorting, in accordance with the graphs theory, to determine a solution for the constraints. A description of topological sorting is given, for example, in the book entitled "*Introduction to algorithms*" by Thomas H. Cormen (ISBN 0-262-03293-7).

Figure 4:
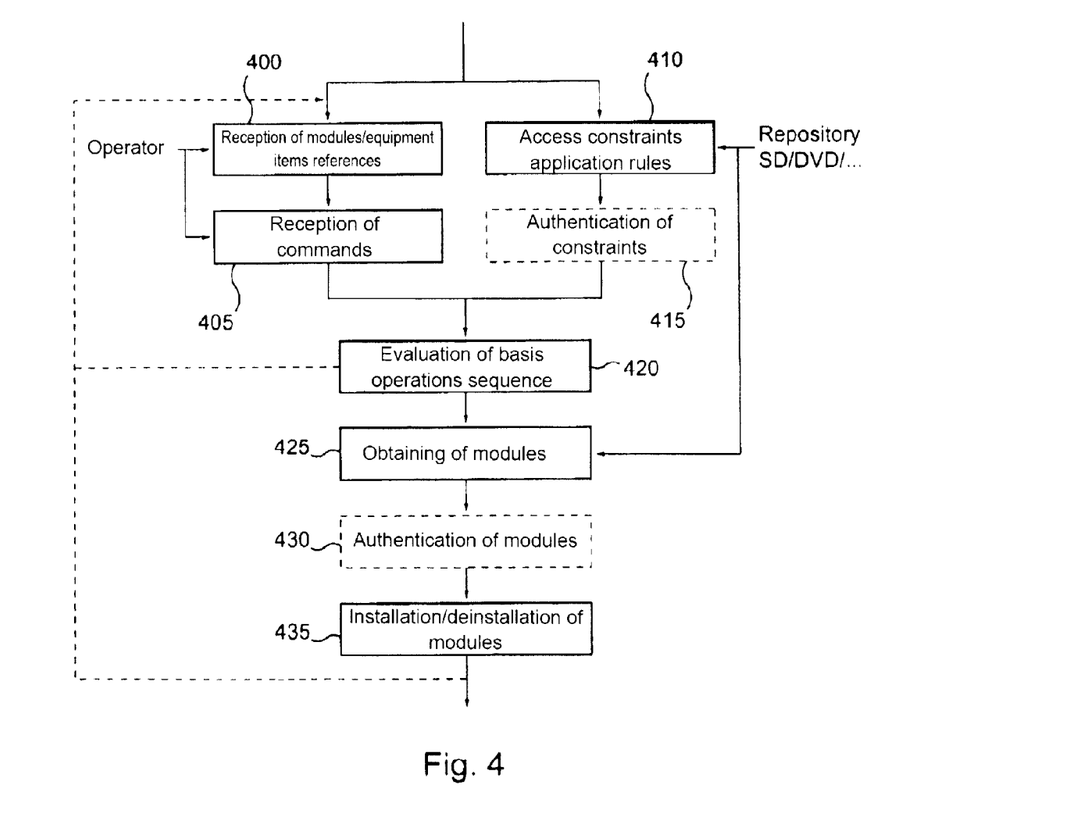
FIG. 4 schematically illustrates certain steps of an exemplary algorithm according to the invention in order to enable an installation/deinstallation of software modules in equipment items of an on-board system, according to dependency constraints, with no specific constraint for the user or for the developers of the software modules.

FIG. 4 schematically illustrates certain steps of an exemplary algorithm according to the invention to enable an installation/deinstallation of software modules in equipment items of an on-board system, according to dependency constraints, with no specific constraint for the user or for the developers of the software modules.

As illustrated, a first step (step 400) here has as an object the reception of a list of references to software modules to be installed and/or deinstalled. This list of references may be captured by an operator or be made up through the selection (performed by the operator or partially automatic) of software modules. This step also comprises the reception of an identifier of the equipment item or items to be subjected to installation or deinstallation of the selected software modules.

In a following step (step 405) a command for installation or deinstallation is received from the operator. It may involve an overall command to a set of software references (for example the command "install software modules A and B") or specific commands to each reference or to groups of references (for example "install module A and deinstall modules B and C").

Steps 400 and 405 typically are implemented in management module 225 or 330 by using interface 230 or 310.

In the same way, beforehand or afterwards, the constraints as well as the rules for application of these constraints, expressed in common or separate form, are accessed (step 410). As described above, the constraints preferably are accessed in a third-party load, available at a specific location (repository) or in a removable storage medium, while the application rules are accessed, for example, in a file linked to the centralized loading system. The application rules typically are associated with constraint resolution module 240 or 315 or comprised therein.

For the sake of security and although not imposed by the method according to the invention (as illustrated by the use of a dotted line on FIG. 4), the constraints advantageously are authenticated (step 415). Since the constraints here are coded in a load, authentication may be accomplished in standard manner, just like the loads corresponding to the software modules.

It is seen that steps 410 and 415 advantageously are executed independently of steps 400 and 405, so that when several installation/deinstallation iterations are contemplated, steps 410 and 415 are executed only once. Likewise, if it is not possible to resolve the constraints and a new selection of software modules is necessary, it is preferable not to re-execute steps 410 and 415.

In a following step (step 420), a sequence of basic operations enabling installation and/or deinstallation of the selected software modules is evaluated. This evaluation is based on the selection made by the operator, the constraints and the rules for application of these constraints, as described above. If it is not possible to obtain such a sequence, a message preferably is addressed to the operator who then may select new software modules to be installed and/or deinstalled or validate a choice proposed by the centralized loading system.

Steps 410 and 420 here are implemented in constraint resolution module 240 or 315. Step 415 typically is implemented in installation module 320 which centralizes the authentication functions for an equipment item.

The software modules to be installed then are obtained (step 425), for example from a specific storage location (repository) or from a removable storage medium. It is seen that this step of obtaining software modules, implemented by the downloading and/or installation modules (DLCS or SCC) advantageously is executed after the step of evaluation of a sequence of basic operations so as to avoid a pointless transfer of these modules. The DLCS or the SCC thus transmits the modules to the target equipment items.

Again, for reasons of security and although not imposed by the method according to the invention (as illustrated by the use of a dotted line on FIG. 4), an authentication step preferably is implemented so as to authenticate the software modules to be installed (step 430). Since the software modules here are coded in loads, authentication may be accomplished in standard manner. Moreover, as described above, a step of verification of dependency constraints is performed, preferably in accordance with the second embodiment described, after the step of authentication of the received modules (check of the integrity of the modules in order to ascertain their identification).

In a following step, the basic operations are executed according to the sequence defined above so as to install and/or deinstall the software modules selected by the operator (and possibly other software modules selected automatically according to dependency constraints).

As illustrated by the dotted-line arrow, the process may be repeated for processing other equipment items and/or software modules.

Figure 5:
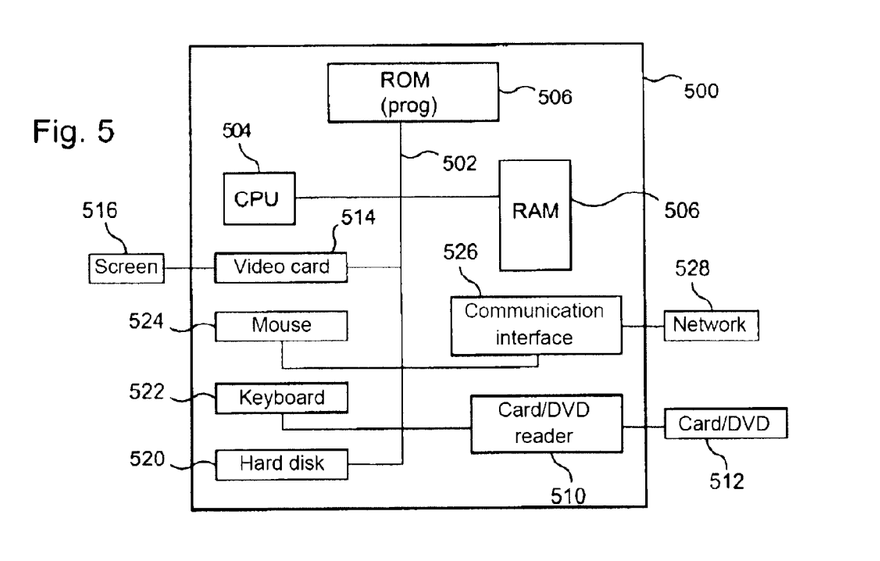
FIG. 5 illustrates an exemplary data processing device adapted for implementing the invention, at least partially.

FIG. 5 illustrates an exemplary device that may be used for implementing the invention at least partially, in particular steps described with reference to FIGS. 2, 3 and 4. Device 500 is, for example, a server, in particular an ANSU-type server.

Device 500 preferably comprises a communication bus 502 to which there are connected:

a central processing unit or microprocessor 504 (CPU, abbreviation for Central Processing Unit in English terminology);

a read-only memory 506 (ROM, acronym for Read Only Memory in English terminology) that may comprise the operating system and programs such as "Prog";

a random-access memory or cache memory 508 (RAM, acronym for Random Access Memory in English terminology) comprising registers adapted for recording variables and parameters created and modified in the course of running of the aforesaid programs;

a reader 510 for removable storage medium 512 such as a memory card or a disk, for example a DVD disk; and a graphics card 514 linked to a screen 516.

Optionally, device 500 also may have the following elements:

a hard disk 520 that may comprise the aforesaid "Prog" programs and data processed or to be processed according to the invention;

a keyboard 522 and a mouse 524 or any other pointing device such as a light pen, a touch screen or a remote control enabling the user to interact with the programs according to the invention, in particular in order to select equipment items and software modules to be installed and/or deinstalled; and a communication interface 526 connected to a distributed communication network 528, for example the AFDX network, the interface being able to transmit and to receive data, in particular to and from an equipment item of an aircraft.

The communication bus allows communication and interoperability among the various components included in device 500 or connected thereto. The depiction of the bus is not limitative and, in particular, the central unit is able to communicate instructions to any component of device 500 directly or via another component of device 500.

The executable code of each program allowing the programmable device to implement the processes according to the invention may be stored, for example, on hard disk 520 or in read-only memory 506.

According to a variant, the executable code of the programs will be able to be received through communication network 528, via interface 526, to be stored in a manner identical to that described above.

More generally, the program or programs will be able to be loaded into one of the storage means of device 500 before being run.

Central unit 504 is going to control and direct the running of the instructions or portions of software code of the program or programs according to the invention, which instructions are stored on hard disk 520 or in read-only memory 506 or else in the other aforesaid storage components. During boot-up, the program or programs that are stored in a non-volatile memory, for example hard disk 520 or read-only memory 506, are transferred to random-access memory 508 which then contains the executable code of the program or programs according to the invention, as well as the registers for storing the variables and parameters necessary for implementation of the invention.

Naturally, in order to satisfy specific needs, an individual competent in the field of the invention will be able to apply modifications in the foregoing description.

```
                    Annex A1
                    ANNEX
// Generic constraints
// Installation constraints
A → B, C
B → C
C →
D → E
E →
// Deinstallation constraints
A ←
B ← A
C ←
D ←
E ← D
// Updating constraints
B =
// Equipment item EQUIP__AA constraints
// Installation constraints
EQUIP__AA: A → B
EQUIP__AA: B → C
EQUIP__AA: D → E, C
//Deinstallation constraints
EQUIP__AA: B ← A, D
EQUIP__AA: E ← D
//Updating constraints
EQUIP__AA: B, C =
```

The invention claimed is:

1. A method for enabling installation or deinstallation of at least one software module in at least one equipment item of an on-board system, according to at least one dependency constraint applicable to the at least one software module for installation or deinstallation of the at least one software module in the at least one equipment item, the method comprising:
    receiving a list of software module references, the list including at least one reference to the at least one software module;
    receiving at least one command, linked to the at least one reference, for installation or deinstallation of the at least one software module in the at least one equipment item;
    accessing, using a processor, the at least one dependency constraint;
    evaluating, using the processor, a sequence of basic operations resolving the at least one dependency constraint for applying the at least one command to the at least one reference for installation or deinstallation of the at least one software module in the at least one equipment item;
    in the event that said evaluating results in a positive determination regarding resolving the at least one dependency constraint for applying the at least one command to the at least one reference, obtaining the at least one software module; and
    in the event that said evaluating results in a negative determination regarding resolving the at least one dependency constraint for applying the at least one command to the at least one reference, repeating said receiving a list of software module references, said receiving at least one command, and said evaluating, but not said accessing.

2. The method according to claim 1, wherein said obtaining the at least one software module is independent of said accessing the at least one dependency constraint.

3. The method according to claim 2, further comprising authenticating the at least one software module, the at least one software module being coded in a structure enabling authentication thereof.

4. The method according to claim 1, further comprising authenticating the at least one dependency constraint, the at least one dependency constraint being coded in a structure enabling authentication thereof, a coding structure of the at least one software module, which enables authentication thereof, and the coding structure of the at least one dependency constraint being separate and independent from each other.

5. A non-transitory computer-readable storage medium storing computer-readable instructions that, when executed by a computer, cause the computer to perform a method according to any one of the preceding claims.

6. The method according to claim 1, wherein installation includes an update or reinstallation of the at least one software module.

7. A device for enabling installation or deinstallation of at least one software module in at least one equipment item of an on-board system, according to at least one dependency constraint applicable to the at least one software module for installation or deinstallation of the at least one software module in the at least one equipment item, the device comprising:
    a processor configured to
    receive a list of software module references, the list including at least one reference to the at least one software module,
    receive at least one command, linked to the at least one reference, for installation or deinstallation of the at least one software module in the at least one equipment item;
    access the at least one dependency constraint;
    evaluate a sequence of basic operations resolving the at least one dependency constraint for applying the at least one command to the at least one reference for installation or deinstallation of the at least one software module in the at least one equipment item;
    obtain the at least one software module in the event that said evaluating results in a positive determination regarding resolving the at least one dependency constraint for applying the at least one command to the at least one reference; and
    repeat the receiving the list of software module references, the receiving at least one command, and the evaluating, but not the accessing, in the event that the evaluating results in a negative determination regarding resolving the at least one dependency constraint for applying the at least one command to the at least one reference.

8. The device according to claim 7, wherein the processor is configured to obtain the at least one software module independently of the accessing of the at least one dependency constraint, and to transmit the at least one software module to the at least one equipment item.

9. An on-board system comprising:
    the device according to claim 7 or claim 8; and
    said at least one equipment item and another equipment item connected to one another via a communication network, the device belonging to said another equipment item in order to enable the installation or deinstallation of the at least one software module in said at least one equipment item.

10. An aircraft comprising the on-board system according to claim 9.

11. An on-board system comprising:
    the device according to claim 7 or claim 8; and
    said at least one equipment item and another equipment item connected to one another via a communication network,
    wherein the receiving the list of software module references and the at least one command are performed at one of the at least two equipment items, and the accessing and evaluating are performed at the other of the at least two equipment items in order to enable the installation or deinstallation of the at least one software module in the other of the at least two equipment items.

12. An aircraft comprising the on-board system according to claim 11.

* * * * *